(12) United States Patent
Brody et al.

(10) Patent No.: US 6,443,294 B1
(45) Date of Patent: Sep. 3, 2002

(54) INTERNAL TENSIONER FOR A CONVEYOR BELT CLEANER

(75) Inventors: Steven E. Brody; James R. Burkhart, both of Kewanee, IL (US)

(73) Assignee: Martin Engineering Company, Neponset, IL (US)

( * ) Notice: Subject to any disclaimer, the term of this patent is extended or adjusted under 35 U.S.C. 154(b) by 78 days.

(21) Appl. No.: 09/657,731

(22) Filed: Sep. 8, 2000

Related U.S. Application Data (60) Provisional application No. 60/153,835, filed on Sep. 14, 1999.

(51) Int. Cl.$^7$ ............................................... B65G 45/16
(52) U.S. Cl. ..................................................... 198/499
(58) Field of Search .......................................... 198/499

(56) References Cited

U.S. PATENT DOCUMENTS

| | | | |
|---|---|---|---|
| 4,533,036 A | 8/1985 | Gordon ...................... | 198/499 |
| 4,925,434 A | 5/1990 | Swinderman et al. ... | 198/499 X |
| 4,995,851 A | 2/1991 | Taylor et al. ........... | 198/499 X |
| 5,201,402 A | 4/1993 | Mott ........................ | 198/499 |
| 5,222,588 A | 6/1993 | Gordon ...................... | 198/499 |
| 5,248,026 A | 9/1993 | Morefield .................. | 198/499 |
| 5,301,797 A | 4/1994 | Hollyfield, Jr. et al. ..... | 198/499 |
| 5,378,202 A | 1/1995 | Swinderman ........... | 198/499 X |
| 5,385,507 A | 1/1995 | Swearingen et al. .......... | 474/92 |
| 5,727,670 A | 3/1998 | Johnson .................. | 198/499 X |
| 6,056,112 A * | 5/2000 | Wiggins .................... | 198/499 |

FOREIGN PATENT DOCUMENTS

| | | | | |
|---|---|---|---|---|
| DE | 197 48 070 A 1 | | 5/1999 | |
| DE | 198 59 263 A 1 | | 7/2000 | |
| JP | 58-2111 | * | 1/1983 | ................. 198/499 |
| SU | 1361079 | * | 12/1987 | ................. 198/499 |
| SU | 1654166 | * | 6/1991 | ................. 198/499 |

* cited by examiner

Primary Examiner—James R. Bidwell
(74) Attorney, Agent, or Firm—Lee, Mann, Smith, McWilliams, Sweeney & Ohlson

(57) ABSTRACT

A tensioner device for imparting a rotational biasing force to the shaft of a conveyor belt cleaner. The tensioner device includes a biasing member wherein a first end of the biasing member includes a first coupler member and a second end of the biasing member includes a second coupler member. The second end of the biasing member is adapted to be inserted into a bore in the shaft of the conveyor belt cleaner such that the second coupler member rotationally couples the second end of the biasing member to the shaft. The tensioner device includes a rotatable actuator member having a recess adapted to receive the first end of the biasing member. A lug extends inwardly into the recess and is adapted to engage the first coupler member of the biasing member such that the first end of the biasing member is rotationally coupled to the actuator member for conjoint rotation at least in one rotational direction. A locking member selectively engages the actuator member to prevent unintentional rotation of the actuator member in at least one rotational direction. Rotation of the actuator member with respect to the. second end of the biasing member stores a rotational biasing force in the biasing member that is applied to the shaft.

24 Claims, 4 Drawing Sheets

INTERNAL TENSIONER FOR A CONVEYOR BELT CLEANER

RELATED APPLICATIONS

This application claims the benefit of U.S. Provisional Application No. 60/153,835, filed Sep. 14, 1999.

BACKGROUND OF THE INVENTION

The present invention relates to an internal tensioner device that is adapted to impart a rotational biasing force to a shaft, and in particular to an internal tensioner device including a biasing member having a first end rotationally coupled to an actuator member and a second end adapted to be disposed within and rotationally coupled to the shaft.

Conveyor belt cleaners are used to remove conveyed material which remains adhered to a moving conveyor belt. Conveyor belt cleaners typically include an elongate cross shaft that is selectively rotatable about a central axis. One or more scraper blades are attached to the cross shaft and are selectively rotated into scraping engagement with the conveyor belt by rotating the cross shaft about its central axis. A tensioner device is often attached to the cross shaft of the conveyor belt cleaner to provide selective rotation of the cross shaft and scraper blades and to thereby maintain the scraper blades in scraping engagement with the conveyor belt as the scraper blades wear during use. Tensioner devices also rotationally bias the scraper blades into scraping engagement with the conveyor belt with a desired amount of torque or biasing force.

SUMMARY OF THE INVENTION

An internal tensioner device adapted to impart a rotational biasing force to the shaft of a conveyor belt cleaner. The tensioner device includes a biasing member having a central axis, a first end and a second end. The first end of the biasing member includes a first outwardly extending coupler member and the second end includes a second outwardly extending coupler member. The second end of the biasing member is adapted to be inserted into a bore of the shaft of the conveyor belt cleaner such that the second coupler member rotationally couples the second end of the biasing member to the shaft. The biasing member may comprise a coil spring wherein the terminal end of the coil at each end of the spring forms an outwardly extending finger.

The tensioner device also includes an actuator member having a peripheral wall that includes a plurality of teeth. A recess is formed within the peripheral wall which is adapted to receive the first end of the biasing member. A spindle located within the recess is adapted to be inserted into a bore of the biasing member. A lug extends inwardly from the peripheral wall into the recess and is adapted to engage the first coupler member of the biasing member such that the first end of the biasing member is rotationally coupled to the actuator member for conjoint rotation at least in one rotational direction. The tensioner device also includes a locking assembly having a locking member such as a pin which is resiliently biased into engagement with a tooth of the actuator member to thereby prevent rotation of the actuator member in at least one rotational direction. Rotation of the actuator member with respect to the second end of the biasing member stores a rotational biasing force in the biasing member that is applied to the shaft.

BRIEF DESCRIPTION OF THE INVENTION

DETAILED DESCRIPTION OF THE PREFERRED EMBODIMENTS

Figures 1, 2:
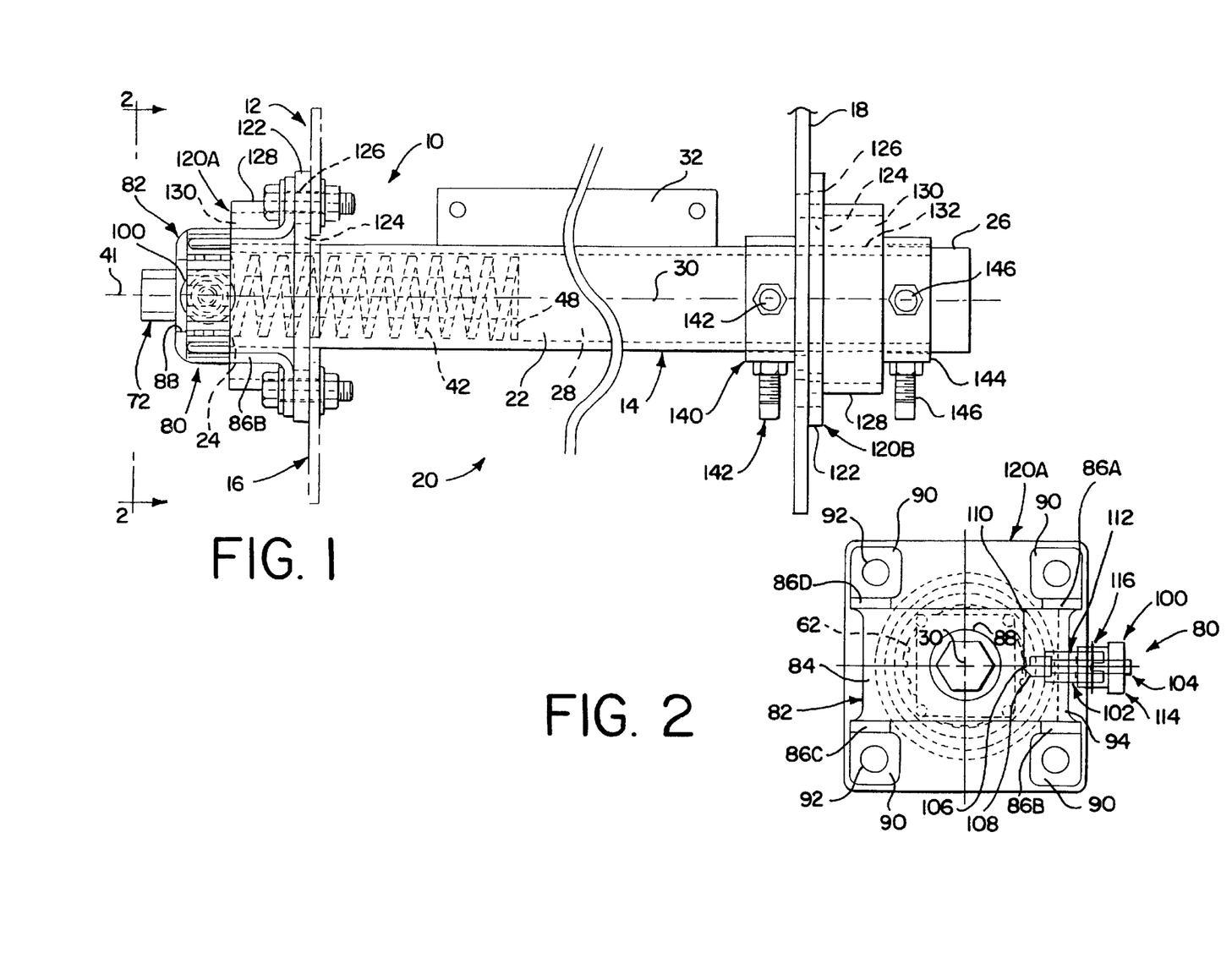
FIG. 1 is a front elevational view of an internal tensioner device of the present invention shown in use with a conveyor belt cleaner.
FIG. 2 is an end view taken along line 2—2 of FIG. 1.

The tensioner device 10, as shown in FIG. 1, is adapted to be coupled to a conveyor chute 12 and to a conveyor belt cleaner 14. The conveyor chute 12 includes a generally planar first wall 16 and a generally planar second wall 18 that is spaced apart from and generally parallel to the first wall 16. A chamber 20 is formed between the first wall 16 and the second wall 18. The conveyor belt cleaner 14 includes an elongate hollow cross shaft 22 having a first end 24 and a second end 26. The cross shaft 22 is preferably formed from a rectangular or square tube having a bore 28 which is also generally rectangular or square in cross-section. The cross shaft 22 includes a central axis 30. The cross shaft 22 is a support member that includes one or more mounting members 32 that are adapted to removably attach one or more scraper blades (not shown) to the cross shaft 22 such that the scraper blades are conjointly rotatable with the cross shaft 22 about the central axis 30. As shown in FIG. 1, the cross shaft 22 extends through an aperture in the first wall 16 and through an aperture in the second wall 18 of the conveyor chute 12 such that the cross shaft 22 is rotatable about the central axis 30 with respect to the walls 16 and 18.

Figure 3:
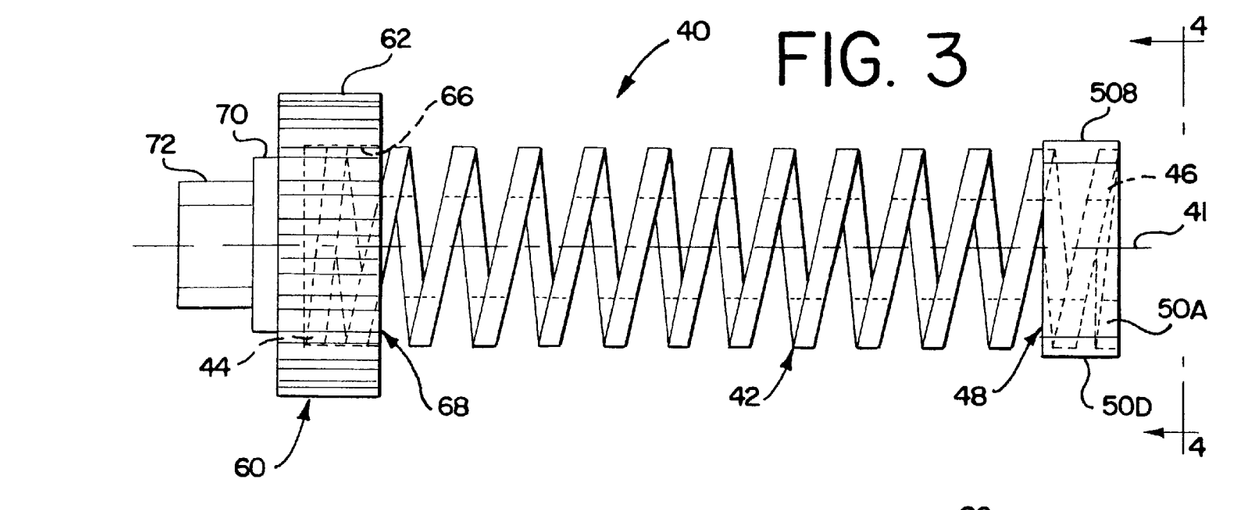
FIG. 3 is a side elevational view of the biasing assembly of the internal tensioner device.
Figure 4:
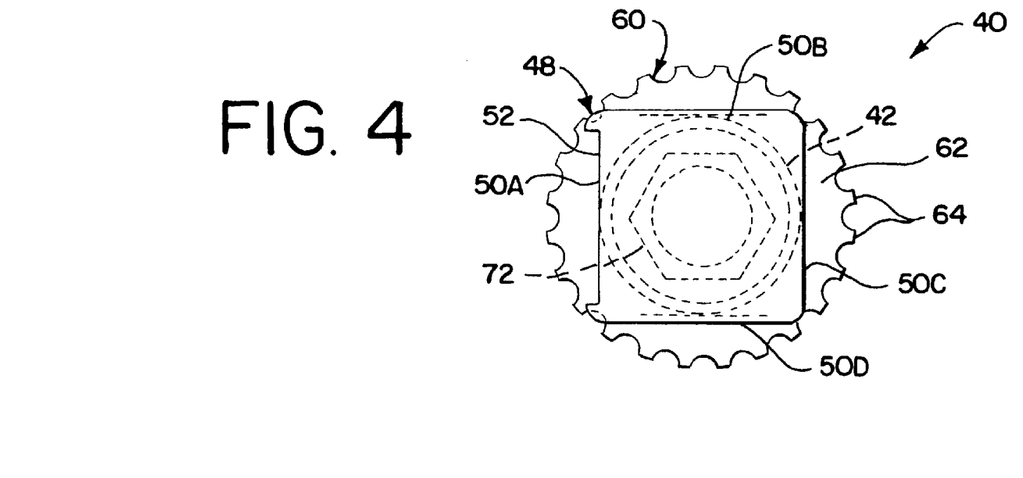
FIG. 4 is an end view of the biasing assembly taken along line 4—4 of FIG. 3.

As best shown in FIGS. 3 and 4, the tensioner 10 includes a biasing assembly 40. The biasing assembly 40 includes a resilient biasing member 42 having a first end 44 and a second end 46. The biasing member 42 as shown in FIG. 3 is a helical coil die spring. However, the biasing member 42 may alternatively be formed from an elongate strip made of metal or of an elastomeric material such as urethane, or the biasing member 42 may be formed from an elongate tube or shaft made from an elastomeric material such as urethane. The biasing assembly 40 includes a central axis 41 which coincides with the central axis 30.

The second end 46 of the biasing member 42 is connected to a coupler block 48. The coupler block 48, as shown in FIG. 4, is configured to fit closely within the bore 28 of the cross shaft 22 such that the coupler block 48 rotationally couples the second end 46 of the biasing member 42 to the cross shaft 22, while the coupler block 48 may slide longitudinally within the bore 28 along the central axis 30. As shown in FIG. 4, the coupler block 48 is generally rectangular or square and includes four side walls 50A–D. The wall 50A includes a recessed notch 52 that is adapted to receive a longitudinally extending weld (not shown) which is normally found in one wall of the rectangular tube which forms the cross shaft 22. The remaining walls 50B–D are adapted to be located in close proximity to the walls of the cross shaft 22. The coupler block 48 may be made from an elastomeric material such as urethane. The second end 46 of the biasing member 42 may be molded within the coupler block 48.

The biasing assembly 40 also includes an actuator member 60 that is connected to the first end 44 of the biasing member 42. The actuator member 60 includes a generally circular gear 62 including a plurality of spaced apart teeth 64 that are located generally parallel to one another around the circumference of the gear 62. The teeth 64 may be spaced apart from one another at an angle of fifteen degrees about the central axis 41. The teeth 64 may be located at other spacings if desired. The actuator member 60 includes a generally rectangular recess or pocket 66. As shown in FIG. 3, the first end 44 of the biasing member 42 is located within the pocket 66. The pocket 66 is adapted to receive a coupler block 68 that may be formed identically to the coupler block 48. The first end 44 of the biasing member 42 is connected to the coupler block 68 either mechanically or it may be molded within the coupler block 68. The coupler block 68 fits closely within the pocket 66 and rotationally couples the first end 44 of the biasing member 42 to the actuator member 60. The actuator member 60 also includes a generally circular collar 70 located on the exterior side of the gear 62. A hexagonal shaft 72 is attached to and extends outwardly from the collar 70 generally concentrically about the central axis 41.

The tensioner 10 also includes a locking assembly 80 that is adapted to be attached to a wall of the conveyor chute 12. The locking assembly 80 includes a housing or bracket 82. The bracket 82 includes a generally rectangular and planar face plate 84 and four legs 86A–D. The face plate 84 includes a centrally located generally circular aperture 88 which is adapted to rotatably receive the collar 70 of the actuator member 60. Each leg 86A–D includes a foot 90. The legs 86A–D are located in a generally rectangular pattern with respect to one another and extend outwardly and generally perpendicular to the face plate 84. Each foot 90 includes an aperture 92 adapted to receive a fastener. The bracket 82 also includes a strut 94, such as a generally planar plate, which is attached to and extends between the legs 86A and 86B.

The locking assembly 80 also includes a locking mechanism 100 such as is disclosed in U.S. Pat. No. 5,385,507 of Martin Engineering Company and which is incorporated herein by reference. The locking mechanism 100 has a cylindrical sleeve 102 that is attached to the strut 94 of the bracket 82. A pin 104 extends through the sleeve 102 and strut 94. The pin 104 includes a tip 106 having a sloped wall 108 and a retaining wall 110. The sloped wall 108 and retaining wall 110 are located at an angle of approximately forty-five degrees relative to one another. A resilient biasing member such as a spring 112 is located around the pin 104 such that one end of the spring 112 engages a lip on the pin 104. The biasing member 112 is compressed between the lip of the pin 104 and a lip in the sleeve 102. A knob 114 is attached to the outer end of the pin 104 by a transverse pin 116 which extends through the knob 114 and the pin 104. The transverse pin 116 is adapted to be located within opposing slots in the sleeve 102 to thereby prevent rotation of the pin 104 about its central axis. The spring 112 resiliently biases the pin 104 and tip 106 from a retracted position to an extended position wherein the tip 106 is located in a notch or pocket between two adjacent teeth 64 of the gear 62. As shown in FIG. 2, the pin 104 will prevent rotation of the gear 62 in a clockwise direction about the central axis 30 while allowing rotational movement of the gear 62 in an opposite counter-clockwise rotational direction. The orientation of the sloped wall 108 and retaining wall l 10 of the tip 106 may be reversed by pulling the knob 1 14 outwardly to remove the transverse pin 1 16 from the slots in the sleeve 102, and rotating the knob 1 14 and pin 104 one hundred and eighty degrees. Various other types of locking mechanisms such as set screws or retainer pins may be used as desired to selectively prevent rotation of the actuator member 60.

A mounting member 120A for the conveyor belt cleaner 14 is removably attached to the first wall 16 of the conveyor chute 12 and a mounting member 120B is removably attached to the second wall 18 of the conveyor chute 12. Each mounting member 120A–B includes a plate 122 having a central aperture 124 and a plurality of peripheral apertures 126. A cylindrical sleeve 128 is mounted to the exterior surface of the plate 122 concentrically about the aperture 124. A cylindrical shock ring 130 having a central bore 132 is located within the sleeve 128. The shock ring 130 is preferably made from an elastomeric material such as urethane. The bore 132 is preferably rectangular and is adapted to receive the shaft 22 of the conveyor belt cleaner 14. The shock ring 130 thereby supports the cross shaft 22 and absorbs radial movements of the shaft 22 due to shock forces which may be applied to the shaft 22. The feet 90 of the legs 86A–D of the bracket 82 are attached to the plate 122 of the mounting member 120A by fasteners which extend through the apertures 92 and 126.

A locking collar 140 extends around the shaft 22 and is located closely adjacent to the second wall 18 of the conveyor chute 12. The locking collar 140 is selectively connected to the shaft 22 by a pair of set screws 142 which are located at an angle of approximately ninety degrees relative to one another. A locking collar 144 extends around the shaft 22 and is located outside the conveyor chute 12 adjacent to the shock ring 130. The locking collar 144 is selectively connected to the shaft 22 by a pair of set screws 146 which are located at an angle of approximately ninety degrees relative to one another. The locking collars 140 and 144 limit the longitudinal movement of the shaft 22 along the central axis 30.

In operation, the second end 46 of the biasing member 42 and the coupler block 48 are inserted into the bore 28 of the cross shaft 22 such that the second end 46 of the biasing member 42 is rotationally coupled to the cross shaft 22 by the coupler block 48. The central axis 41 of the biasing assembly 40 is located generally coaxially with the central axis 30 of the cross shaft 22. The actuator member 60 is located adjacent the first end 24 of the cross shaft 22. The first end 44 of the biasing member 42 and coupler block 68 are located within the pocket 66 of the actuator member 60 such that the first end 44 of the biasing member 42 is rotationally coupled to the actuator member 60 for conjoint rotation about the axis 30. The collar 70 of the actuator member 60 is rotatably located within the central aperture 88 in the face plate 84. The gear 62 is located adjacent the interior of the face plate 84 and across from the locking mechanism 100. The hexagonal shaft 72 is located on the exterior side of the face plate 84.

The spring 112 of the locking mechanism 100 resiliently biases the tip 106 of the pin 104 into engagement with the teeth 64 of the gear 62. The retaining wall 110 of the pin 104 engages a tooth 64 of the gear 62 to prevent rotation of the actuator member 60 in a clockwise direction as shown in FIG. 2. However, the actuator member 60 may be rotated in a counter-clockwise direction as shown in FIG. 2 by the use of a wrench or other implement attached to the hexagonal shaft 72. The sloped wall 108 of the pin 104 allows the teeth 64 of the gear 62 to resiliently slide the pin 104 outwardly along its central axis thereby compressing the spring 112 and thereby allowing the teeth 64 to rotationally pass by the tip 106. When the counter-clockwise movement of the actuator member 60 is stopped, the biasing member 112 will bias the tip 106 of the pin 104 outwardly into a notch between two teeth 64 such that the retaining wall 110 will prevent clockwise rotation of the actuator member 60.

The actuator member 60 is initially rotated in the counter-clockwise direction as shown in FIG. 2 to provide a corresponding counter-clockwise rotation of the biasing member 42, cross shaft 22 and scraper blades about the central axis 30. Once the scraper blades engage the conveyor belt, continued rotation of the actuator member 60 in the counter-clockwise direction will cause rotation of the first end 44 of the biasing member 42 about the central axis 30 while the second end 46 of the biasing member 42 and the cross shaft 22 remain relatively stationary. The first end 44 of the biasing member 42 is thereby rotated about the central axis 30 with respect to the second end 46 of the biasing member 42 such that the biasing member 42 becomes twisted along the axis 41. As the actuator member 60 and first end 44 of the biasing member 42 are rotated with no corresponding rotation of the second end 46 of the biasing member 42, coupler block 48 or shaft 22, the biasing member 42 is twisted and a torsional biasing moment is created and stored within the biasing member 42 and is applied to the shaft 22. When the desired amount of torsional biasing force has been created and stored in the biasing member 42 further manual rotation of the actuator member 60 is stopped. The locking mechanism 100 retains the actuator member 60 in place to retain the stored biasing force in the biasing member 42.

As the scraper blades wear, the biasing member 42 will begin to untwist and thereby cause the coupler block 48 and cross shaft 22 to rotate about the central axis 30 and thereby rotate the scraper blades in continued contact with the conveyor belt. The biasing member 42 will continue to rotate the cross shaft 22 and scraper blades until the biasing member 42 returns to its original non-biased or untwisted position. The biasing member 42 will absorb any rotational forces or shocks that are transmitted to the shaft 22 by the scraper blades and thereby prevents damage to the conveyor belt cleaner 14. The amount of torsional biasing force provided by the biasing member 42 may be adjusted by utilizing biasing members 42 of different lengths, with more or less coils per unit length, or with coils of different thicknesses.

Once the actuator member 60 has been rotated in the counter-clockwise direction to a position wherein the scraper blades begin to engage the conveyor belt, the actuator member 60 may then be further rotated such that a desired number of teeth 64 pass by the tip 106 of the pin 104 of the locking mechanism 100. The number of teeth 64 that pass by the pin 104 after the scraper blades are in engagement with the conveyor belt correspond to the amount of twist which is created in the biasing member 42, which in turn corresponds to the amount of biasing torque or force that the biasing member 42 applies to the cross shaft 22. For example, if the teeth 64 are spaced at an angle of fifteen degrees with respect to one another, a rotation of three teeth past the pin 104 will result in the actuator member 60 rotating forty-five degrees and in forty-five degrees of twist being imparted to the biasing member 42. Therefore the desired magnitude of biasing force with which the scraper blades are biased into engagement with the conveyor belt may be obtained by rotating the required number of teeth 64 past the tip 106 of the pin 104 after the scraper blades are in engagement with the conveyor belt. If desired, two tensioners 10 may be applied to the conveyor belt cleaner 14, one at each end of the cross shaft 22.

Figure 5:
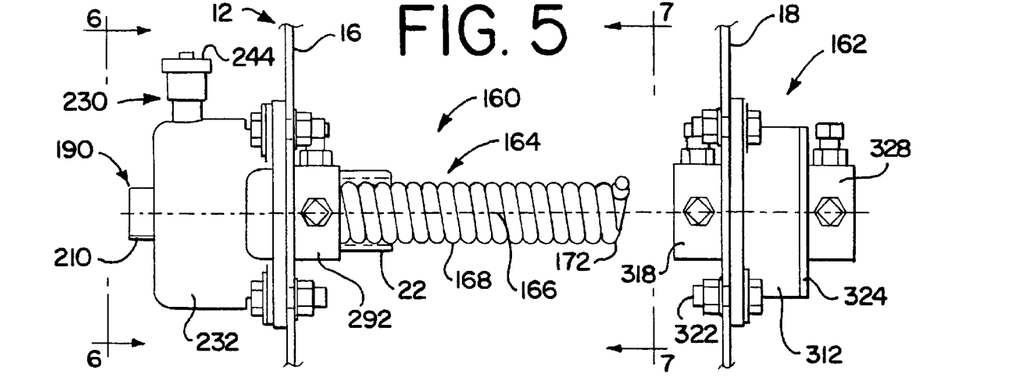
FIG. 5 is a front elevational view of a modified embodiment of an internal tensioner device of the present invention.

A modified embodiment of the tensioner device of the present invention is shown in FIG. 5 and is identified with the reference number 160. As shown in FIG. 5, the tensioner 160 is adapted to be removably attached to the first wall 16 of the conveyor chute 12. A mounting assembly 162 is removably attached to the second wall 18 of conveyor chute 12. The tensioner 160 and mounting assembly 162 are adapted to rotatably mount a conveyor belt cleaner 14 having a generally rectangular or square cross shaft 22 to the conveyor chute 12.

Figures 6, 7, 8:
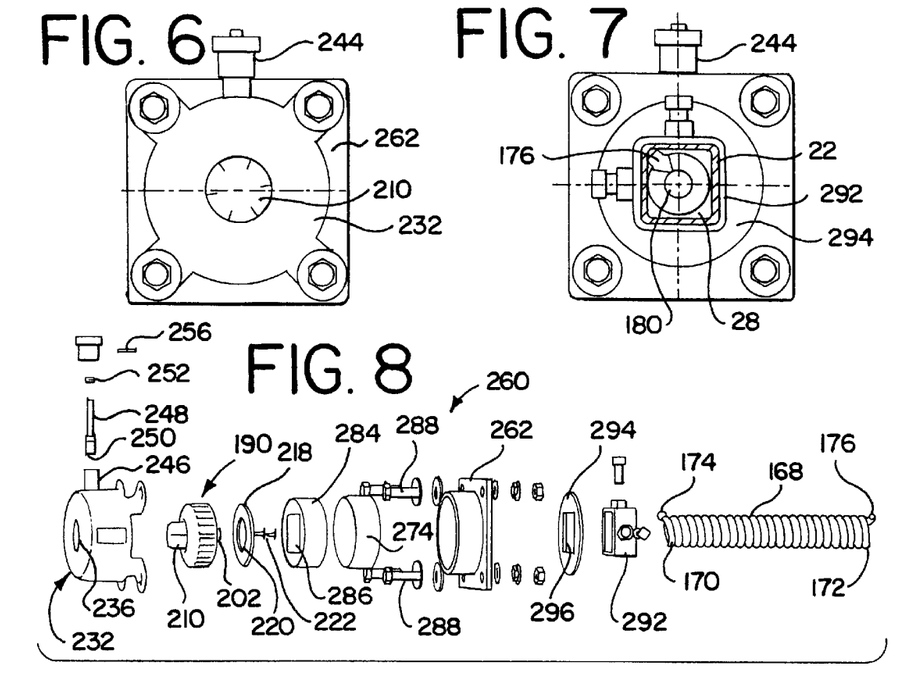
FIG. 6 is an end view of the internal tensioner device taken along line 6—6 of FIG. 5.
FIG. 7 is an end view of the internal tensioner device taken along line 7—7 of FIG. 5.
FIG. 8 is an exploded view of the internal tensioner device shown in FIG. 5.
Figure 9:
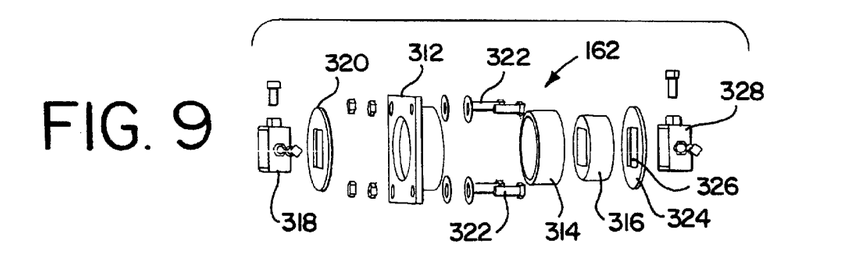
FIG. 9 is an exploded view of the mounting assembly shown in FIG. 5.
Figures 10, 11, 12, 13, 14:
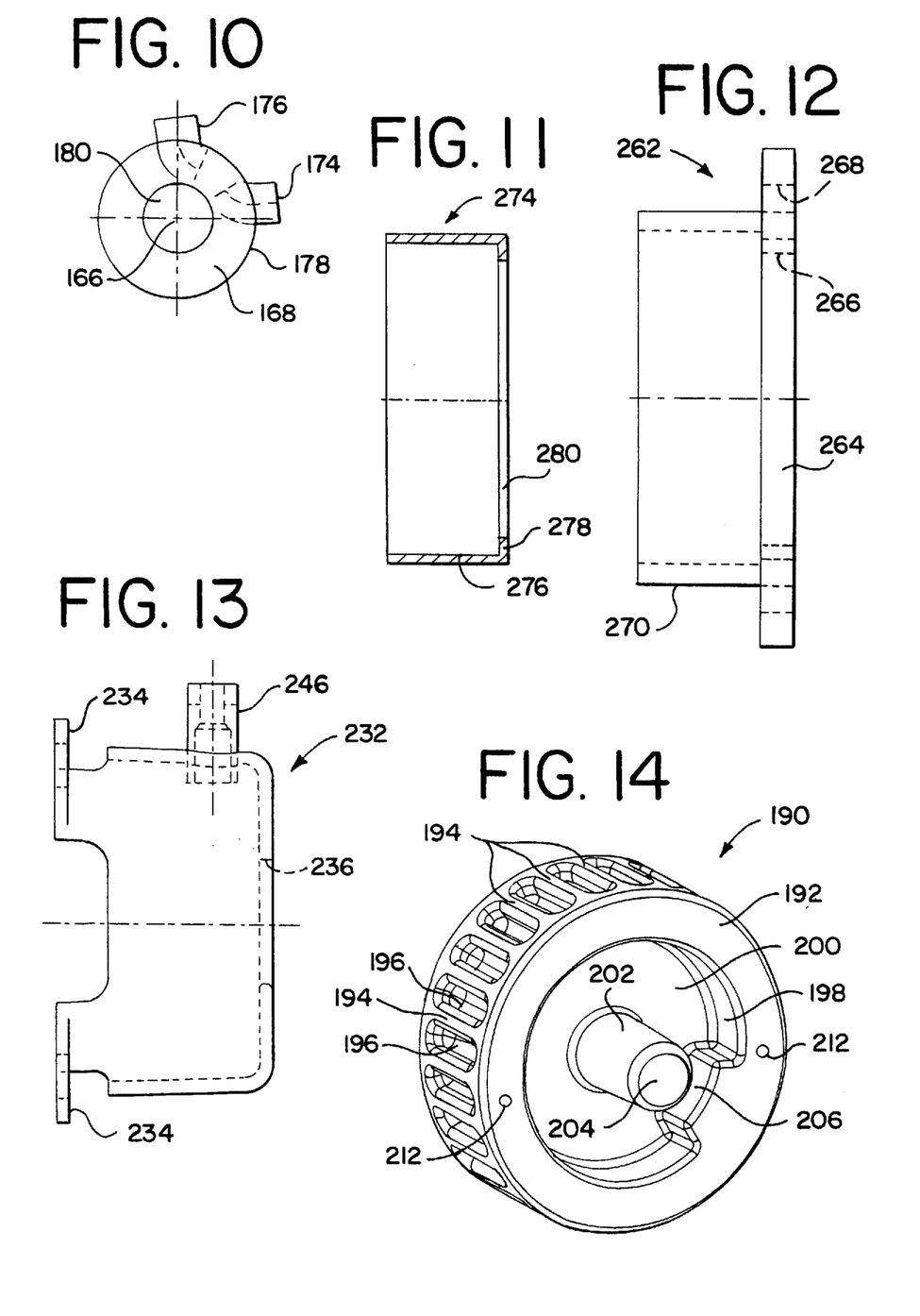
FIG. 10 is an end view of the biasing member of the internal tensioner device of FIG. 5.
FIG. 11 is a cross-sectional view of a bushing of the tensioner device.
FIG. 12 is a side elevational view of a mounting member of the tensioner device.
FIG. 13 is a side elevational view of a housing of the tensioner device.
FIG. 14 is a perspective view of the actuator member of the internal tensioner device of FIG. 5.

The tensioner 160 includes a biasing assembly 164 having a central longitudinal axis 166. The biasing assembly 164 includes a resilient biasing member 168 having a first end 170 and a second end 172. As shown in FIG. 8, the biasing member 168 is a helical coil torsion spring having a plurality of coils. The first end 170 of the biasing member 168 includes a first coupler member 174 and the second end 172 of the biasing member 168 includes a second coupler member 176. As best shown in FIG. 10, each coupler member 174 and 176 is a finger formed by a terminal end of a coil that extends generally radially outwardly beyond the outer circumference 178 of the biasing member 168. As best shown in FIG. 7, the biasing member 168 is sized such that the outer circumference 178 of the biasing member 168 fits in the bore 28 closely within the walls of the shaft 22 with the second coupler member 176 located in a corner of the shaft 22. As the biasing member 168 is rotated about the axis 166, the second coupler member 176 engages a wall of the shaft 22 and thereby rotates the shaft 22 conjointly with the second end 172 of the biasing member 168. The second coupler member 176 of the biasing member 168 thereby rotationally couples the second end 172 of the biasing member 168 to the shaft 22 of the conveyor belt cleaner 14. While the second end 172 of the biasing member 168 is rotationally coupled to the shaft 22 by the second coupler member 176, the second end 172 of the biasing member 168 may be axially inserted and removed from the bore 28 of the shaft 22 along the central axis 30 of the shaft 22.

The biasing assembly 164 also includes an actuator member 190 as best shown in FIGS. 8 and 14. The actuator member 190 includes a generally circular drive member 192 having a circular peripheral wall that includes a plurality of spaced apart teeth 194 located generally parallel to one another around the circumference of the drive member 192. The teeth 194 are formed by a plurality of pockets 196 that are formed in the circumference of the drive member 192. The drive member 192 includes an annular pocket or recess 198 within the peripheral wall. The recess 198 extends inwardly from a side wall of the drive member 192 to an end wall 200. A tapered spindle 202 is located within the recess 198 concentrically with the axis 166. The spindle 202 is attached at one end to the end wall 200 and extends outwardly to a tip 204 which projects outwardly beyond the side wall of the drive member 192. The spindle 202 is adapted to be inserted into the bore 180 of the biasing member 168 at its first end 170. The drive member 192 also includes a lug 206 that extends generally radially inwardly from the peripheral wall into the recess 198. The lug 206 is adapted to engage the first coupler member 174 at the first end 170 of the biasing member 168 such that the lug 206 and the first coupler member 174 rotationally couple the first end 170 of the biasing member 168 to the actuator member 190 for conjoint rotation about the axis 166. The actuator member 190 also includes a generally hexagonal shaft 210 that is attached to and extends outwardly from the drive member 192 generally concentrically along the axis 166. The side wall of the drive member 192 includes a pair of threaded bores 212 as best shown in FIG. 14.

The actuator member 190 also includes a retention member 218 in the form of an annular plate or disk. The retention member 218 includes a central circular aperture 220 through which the biasing member 164 extends. The retention member 218 is attached to the drive member 192 by threaded fasteners 222 which extend into the threaded bores 212 of the drive member 192. The retention member 218 prevents axial removal of the first end 170 of the biasing member 168 from the spindle 202 and recess 198 of the actuator member 190.

The tensioner 160 also includes a locking assembly 230 that is adapted to be attached to a wall of the conveyor chute 12. The locking assembly 230 includes a bracket or housing 232 as best shown in FIG. 13. The housing 232 includes a plurality of feet 234 each having an aperture. The housing 232 includes a circular aperture 236 through which the hexagonal shaft 210 of the actuator member 190 extends.

The locking assembly 230 includes a locking mechanism 244 which is constructed generally in the same manner as the locking mechanism 100 described above and as disclosed in U.S. Pat. No. 5,385,507 of Martin Engineering Company. The locking mechanism 244 includes a cylindrical sleeve 246 attached to the housing 232. A pin 248 having a tip 250 extends through the sleeve 246. The tip 250 includes a sloped wall and a retaining wall. A resilient biasing member such as a spring 252 is located around the pin 248 such that one end of the spring engages a lip on the pin 248 and a second end of the spring engages a lip in the sleeve 246. A knob 254 is attached to the outer end of the pin 248 by a transverse pin 256 which extends through the knob 254 and the pin 248. The spring 252 resiliently biases the pin 248 and its tip 250 into engagement with the drive member 192 that is located within the housing 232. The tip 250 of the pin 248 is adapted to be located within a pocket 196 of the drive member 192 and to engage a tooth 194. The locking assembly 230 thereby selectively prevents rotation of the actuator member 190 in a selected rotational direction.

The tensioner 160 includes a mounting assembly 260. The mounting assembly 260 includes a mounting member 262. The mounting member 262 includes a plate 264 having a central circular aperture 266 and a plurality of peripheral apertures 268. A cylindrical sleeve 270 is mounted to the exterior surface of the plate 264 concentrically about the aperture 266. The plate 264 is adapted to be located against the first wall 16 of the conveyor chute 12. A bushing 274, as best shown in FIG. 11, is located within the sleeve 270. The bushing 274 is made from nylon or other low friction materials. The bushing 274 includes a generally cylindrical side wall 276 and an inwardly extending lip 278 at one end which forms a circular aperture 280. The aperture 280 is aligned with the central aperture 266 in the mounting member 262. A cylindrical shock ring 284 having a rectangular or square central bore 286 is located within the bushing 274. The bushing 274 facilitates rotational movement of the shock ring 284 about the axis 166 with respect to the mounting member 262. The bore 286 is adapted to receive the shaft 22 of the conveyor belt cleaner 14. The shock ring 284 is preferably made from an elastomeric material such as urethane. The shock ring 284 supports the cross shaft 22 and absorbs radial movements of the shaft 22 due to shock forces which may be applied to the shaft 22. The feet 234 of the housing 232 are attached to the mounting member 262 by fasteners 288.

A locking collar 292 extends around the shaft 22 and is located closely adjacent to the interior surface of the first wall 16 of the conveyor chute 12. The locking collar 292 includes a plurality of set screws that are adapted to selectively connect the locking collar 292 to the shaft 22. An abutment member 294 such as a plate is located between the locking collar 292 and the first wall 16 of the conveyor chute 12. The abutment member 294 includes a generally rectangular central aperture 296 through which the shaft 22 extends. The abutment member 292 prevents the locking collar 292 from moving longitudinally along the axis 166 through the aperture in the first wall 16 of the conveyor chute 12.

The mounting assembly 162 includes a mounting member 312, a bushing 314, a shock ring 316, a locking collar 318, and an abutment member 320 which are constructed and assembled in the same manner as the corresponding parts in the mounting assembly 260. The mounting member 312 is removably attached to the second wall 18 of the conveyor chute 12 by a plurality of threaded fasteners 322. The mounting assembly 162 additionally includes a second abutment member 324 having a substantially rectangular central aperture 326. The abutment member 324 is located adjacent the outer rim of the collar on the mounting member 312 such that the shaft 22 extends through the aperture 326. A locking collar 328 having a plurality of threaded set screws is placed over the shaft 22 and adjacent the abutment member 324. The locking collars 318 and 328 substantially prevent longitudinal movement of the shaft 22 along the central axis 30.

In operation, the first end 170 of the biasing member 168 is inserted through the locking collar 292, abutment member 294, shock ring 284, retention member 218 and into the recess 198 of the drive member 192 with the spindle 202 being inserted into the bore 180 at the first end 170 of the biasing member 168. The retention member 218 is attached to the drive member 192 with the fasteners 222 to retain the first end 170 of the biasing member 168 in engagement with the drive member 192. The first coupler member 174 of the biasing member 168 is adapted to engage the lug 206 of the drive member 192 such that the first end 170 of the biasing member 168 is rotationally coupled to the drive member 192. The biasing member 168 extends within the bore 28 of the cross shaft 22 at the first end 24 of the cross shaft 22 such that the second coupler member 176 at the second end 172 of the biasing member 168 is rotationally coupled to the shaft 22.

The first end 24 of the cross shaft 22 extends through the locking collar 292, abutment member 294 and into the aperture 286 of the shock ring 284. The second end 26 of the cross shaft 22 extends through the locking collar 318, abutment member 320, shock ring 316, abutment member 324 and locking collar 328. Selective rotation of the actuator member 190 about the axis 166 provides a corresponding rotation of the biasing member 68 and of the cross shaft 22 about the central axis 166. As the scraper blades engage the conveyor belt, continued rotation of the actuator member 190 causes rotation of the first end 170 of the biasing member 168 about the central axis 166 while the second end 172 of the biasing member 168 and the cross shaft 22 remain relatively stationary. Further rotation of the actuator member 190 causes the first end 170 of the biasing member 168 to rotate about the central axis 166 with respect to the second end 172 such that the biasing member 168 is twisted and a torsional biasing force is created and stored within the biasing member 168 that is applied to the shaft 22. When the desired amount of torsional biasing force has been created and stored in the biasing member 168 further manual rotation of the actuator member 190 is stopped. The locking mechanism 244 retains the actuator member 190 in place to retain the stored biasing force in the biasing member 168. If desired, a respective tensioner 160 may be applied to each end of cross shaft 22 of the conveyor belt 14.

When an operator is rotating the actuator member 190 in a counter-clockwise direction as shown in FIG. 6, by application of a wrench or other tool to the hexagonal shaft 210, and the scraper blades are rolled-through by the conveyor belt after the scraper blades initially engage the belt, the first coupler member 174 of the biasing member 168 will rotate counter-clockwise and will disengage from the lug 206 without causing any rotation of the actuator member 190 and thereby preventing potential injury to the operator that may otherwise result from a sudden rotation of the actuator member 190.

Various features of the invention have been particularly shown and described in connection with the illustrated embodiments of the invention, however, it must be understood that these particular arrangements merely illustrate, and that the invention is to be given its fullest interpretation within the terms of the appended claims.

What is claimed is:

1. A tensioner device for imparting a rotational biasing force to a support member, said tensioner device including:
    a biasing member having a central axis, a first end and a second end, said first end including a first coupler member and said second end including a second coupler member, said second coupler member adapted to rotationally couple said second end of said biasing member to the support member;
    an actuator member adapted to receive said first coupler member of said first end of said biasing member such that said first coupler member rotationally couples said first end of said biasing member to said actuator member, said actuator member being selectively rotatable about said central axis, said actuator member including a peripheral wall having a plurality of teeth; and
    a locking member adapted to releasably engage at least one of said teeth of said actuator member and thereby prevent rotation of said actuator member in at least one rotational direction.

2. A tensioner device for imparting a rotational biasing force to a support member, said tensioner device including:
    a mounting member having a collar adapted to be attached to a stationary structure, and a shock ring located within said collar, said shock ring including an aperture adapted to receive the support member;
    a biasing member having a central axis, a first end and a second end, said first end including a first coupler member and said second end including a second coupler member, said second coupler member adapted to rotationally couple said second end of said biasing member to the support member;
    an actuator member adapted to receive said first coupler member of said first end of said biasing member such that said first coupler member rotationally couples said first end of said biasing member to said actuator member, said actuator member being selectively rotatable about said central axis; and
    a locking member adapted to releasably engage said actuator member and thereby prevent rotation of said actuator member in at least one rotational direction.

3. A tensioner device for imparting a rotational biasing force to a support member, said tensioner device including:
    a biasing member having a central axis, a first end and a second end, said first end including a first coupler member and said second end including a second coupler member, said second coupler member adapted to rotationally couple said second end of said biasing member to the support member, said second coupler member comprising a finger extending outwardly from said second end of said biasing member generally transversely to said central axis of said biasing member;
    an actuator member adapted to receive said first coupler member of said first end of said biasing member such that said first coupler member rotationally couples said first end of said biasing member to said actuator member, said actuator member being selectively rotatable about said central axis; and
    a locking member adapted to releasably engage said actuator member and thereby prevent rotation of said actuator member in at least one rotational direction.

4. The tensioner device of claim 3 wherein said biasing member comprises a spring.

5. The tensioner device of claim 3 wherein said first coupler member comprises a finger extending outwardly from said first end of said biasing member.

6. The tensioner device of claim 5 wherein said biasing member includes a bore and said actuator member includes a spindle, said spindle adapted to be inserted into said bore of said biasing member at said first end of said biasing member.

7. The tensioner device of claim 5 including a retainer member attached to said actuator member, said retainer member including an aperture through which said biasing member extends, said retainer member adapted to prevent removal of said biasing member from said actuator member.

8. The tensioner device of claim 5 wherein said actuator member includes a lug adapted to engage said finger at said first end of said biasing member.

9. The tensioner device of claim 3 wherein said actuator member includes a peripheral wall having a plurality of teeth, and said locking member is adapted to releasably engage one of said teeth.

10. The tensioner device of claim 9 wherein said locking member comprises a pin.

11. The tensioner device of claim 9 including a spring that resiliently biases said locking member into engagement with said actuator member, whereby said locking member prevents rotation of said actuator member about said axis in a first rotational direction but allows rotation of said actuator member about said axis in a second rotational directional.

12. The tensioner device of claim 3 including a mounting member having a collar adapted to be attached to a stationary structure, and a shock ring located within said collar, said shock ring including an aperture adapted to receive the support member, said shock ring being rotatable with respect to said mounting member about said axis.

13. The tensioner device of claim 12 including a bushing disposed between said shock ring and said mounting member.

14. A tensioner device for imparting a rotational biasing force to a shaft, said tensioner device including:
- a biasing member having a central axis, a first end and a second end, said first end including a first coupler member and said second end including a second coupler member, said second coupler member adapted to rotationally couple said second end of said biasing member to the shaft; and
- an actuator member including a spindle having a tip and a third coupler member adapted to engage said first coupler member of said biasing member such that said first end of said biasing member is rotationally coupled to said actuator member for conjoint rotation at least in one rotational direction, said spindle adapted to be inserted into said biasing member;
- whereby rotation of said actuator member with respect to said second end of said biasing member stores a rotational biasing force in said biasing member that is applied to the shaft.

15. The tensioner device of claim 14 wherein said first coupler member comprises a finger extending outwardly from said biasing member.

16. The tensioner device of claim 14 wherein said second coupler member comprises a finger extending outwardly from said biasing member.

17. The tensioner device of claim 14 wherein said third coupler member comprises a lug.

18. The tensioner device of claim 14 wherein said biasing member includes a bore, said tip of said spindle being inserted into said bore of said biasing member.

19. The tensioner device of claim 14 wherein said actuator member includes a recess adapted to receive said first end of said biasing member, said spindle being located in said recess.

20. The tensioner device of claim 19 wherein said third coupler member comprises a lug located in said recess of said actuator member.

21. A tensioner device for imparting a rotational biasing force including:
- a support member having a bore,
- a biasing member having a central axis, a first end and a second end, said first end including a first coupler member and said second end including a second coupler member, said second coupler member adapted to be disposed within said bore of said support member and to rotationally couple said second end of said biasing member to said support member;
- an actuator member adapted to receive said first coupler member of said first end of said biasing member such that said first coupler member rotationally couples said first end of said biasing member to said actuator member, said actuator member being selectively rotatable about said central axis, and
- a locking member adapted to releasably engage said actuator member and thereby prevent rotation of said actuator member in at least one rotational direction.

22. A tensioner device for imparting a rotational biasing force to a support member, said tensioner device including:
- a biasing member having a central axis, a first end and a second end, said first end including a first coupler member and said second end including a second coupler member, said second coupler member comprising a generally rectangular block adapted to rotationally couple said second end of said biasing member to the support member;
- an actuator member adapted to receive said first coupler member of said first end of said biasing member such that said first coupler member rotationally couples said first end of said biasing member to said actuator member, said actuator member being selectively rotatable about said central axis; and
- a locking member adapted to releasably engage said actuator member and thereby prevent rotation of said actuator member in at least one rotational direction.

23. The tensioner device of claim 22 wherein said first coupler member comprises a generally rectangular block.

24. A tensioner device for imparting a rotational biasing force to a support member, said tensioner device including:
- a biasing member having a central axis, a first end and a second end, said first end including a first coupler member and said second end including a second coupler member, said second coupler member adapted to rotationally couple said second end of said biasing member to the support member, said second coupler member comprising a finger extending outwardly from said first end of said biasing member;
- an actuator member adapted to receive said finger of said biasing member, said actuator member including a lug adapted to engage said finger of said biasing member such that said finger rotationally couples said first end of said biasing member to said actuator member, said actuator member being selectively rotatable about said central axis; and
- a locking member adapted to releasably engage said actuator member and thereby prevent rotation of said actuator member in at least one rotational direction.

* * * * *